(12) United States Patent
Birk

(10) Patent No.: US 6,269,766 B1
(45) Date of Patent: Aug. 7, 2001

(54) TEATCUP MAGAZINE, A MILKING ARRANGEMENT, AND A METHOD OF HANDLING A TEATCUP

(75) Inventor: Uzi Birk, Huddinge (SE)

(73) Assignee: Alfa Laval Agri AB, Tumba (SE)

( * ) Notice: Subject to any disclaimer, the term of this patent is extended or adjusted under 35 U.S.C. 154(b) by 0 days.

(21) Appl. No.: 09/402,809

(22) PCT Filed: Mar. 31, 1998

(86) PCT No.: PCT/SE98/00596

§ 371 Date: Jan. 24, 2000

§ 102(e) Date: Jan. 24, 2000

(87) PCT Pub. No.: WO98/46069

PCT Pub. Date: Oct. 22, 1998

(30) Foreign Application Priority Data

Apr. 11, 1997 (SE) .................................................... 9701310

(51) Int. Cl.$^7$ ........................................................ A01J 5/00
(52) U.S. Cl. .................. 119/14.1; 119/14.02; 119/14.13; 119/14.18
(58) Field of Search ............................... 119/14.02, 14.1, 119/14.13, 14.18, 520

(56) References Cited

U.S. PATENT DOCUMENTS

| 2,812,742 | | 11/1957 | Millar . | |
|---|---|---|---|---|
| 3,938,470 | * | 2/1976 | Pace | 119/14.1 |
| 3,958,584 | * | 5/1976 | Jones | 134/56 R |
| 4,586,462 | * | 5/1986 | Icking | 119/14.1 |
| 5,069,160 | | 12/1991 | Street et al. . | |
| 5,279,253 | * | 1/1994 | Lubberink | 119/14.08 |
| 5,379,722 | * | 1/1995 | Larson | 119/14.1 |
| 5,479,876 | * | 1/1996 | Street et al. | 119/14.08 |
| 5,713,301 | * | 2/1998 | van der Lely | 119/14.02 |
| 5,784,994 | * | 7/1998 | van der Lely | 119/14.08 |
| 5,865,138 | * | 2/1999 | van der Lely | 119/14.02 |
| 6,009,833 | * | 1/2000 | van der Lely | 119/14.02 |

FOREIGN PATENT DOCUMENTS

| 91892 | 10/1983 | (EP) . |
|---|---|---|
| 213660 | 3/1987 | (EP) . |
| 300115 | 1/1989 | (EP) . |
| 300582 | 1/1989 | (EP) . |
| 647391 | 4/1995 | (EP) . |
| WO 9007268 | 7/1990 | (WO) . |
| WO 9300001 | 1/1993 | (WO) . |

* cited by examiner

Primary Examiner—Peter M. Poon
Assistant Examiner—Kevin Jakel
(74) Attorney, Agent, or Firm—Hovey, Williams, Timmons & Collins

(57) ABSTRACT

A milking arrangement comprising a milking apparatus, having at least one teatcup (2) and a teatcup magazine (5) for holding the teatcup. The teatcup (2) has an opening through which a teat of an animal is introduced during the attachment of the teatcup to the teat. The teatcup magazine (5) comprises at least one first member (6) provided to receive the teatcup and a second member (7) provided to support the first member (6). The first member (6) is movably connected to the second member (7) between a first position, in which the teatcup (2) received by the first member has its opening turned substantially downwards, and a second position in which the teatcup (2) is received by the first member has its opening turned in direction substantially deviating from the downward direction.

27 Claims, 8 Drawing Sheets

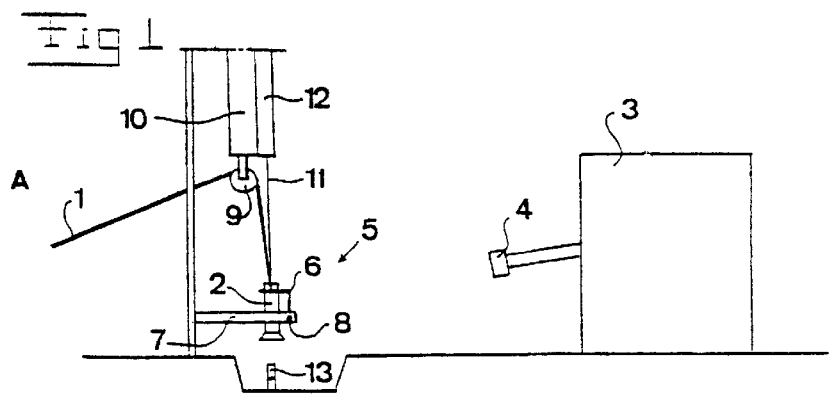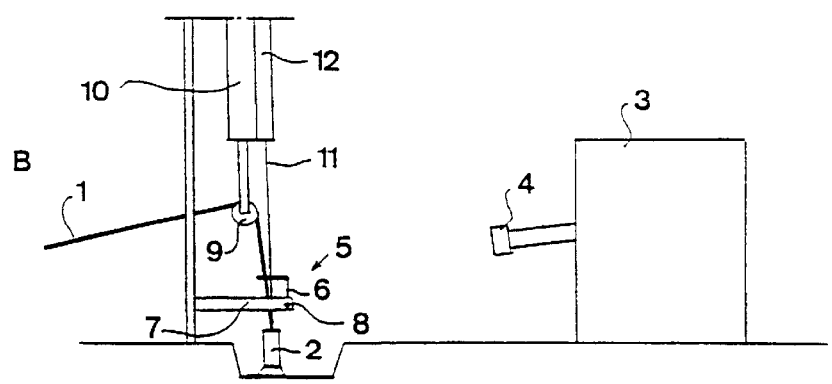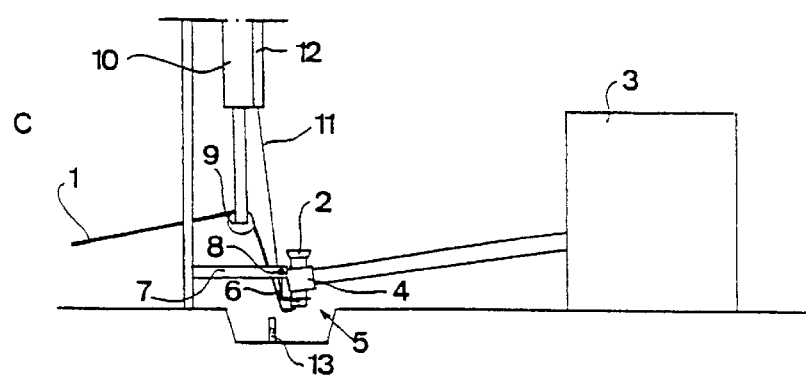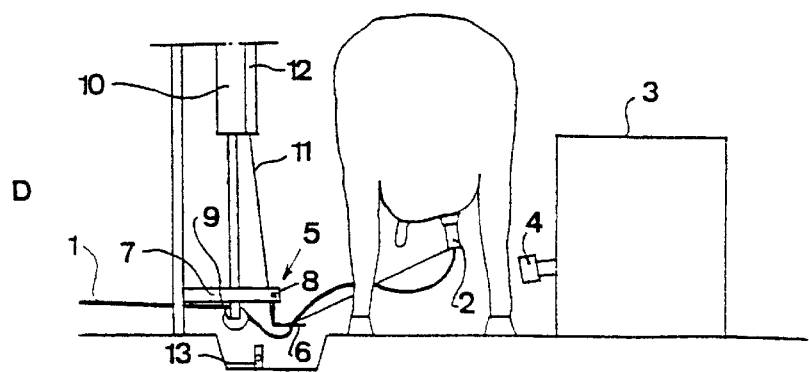

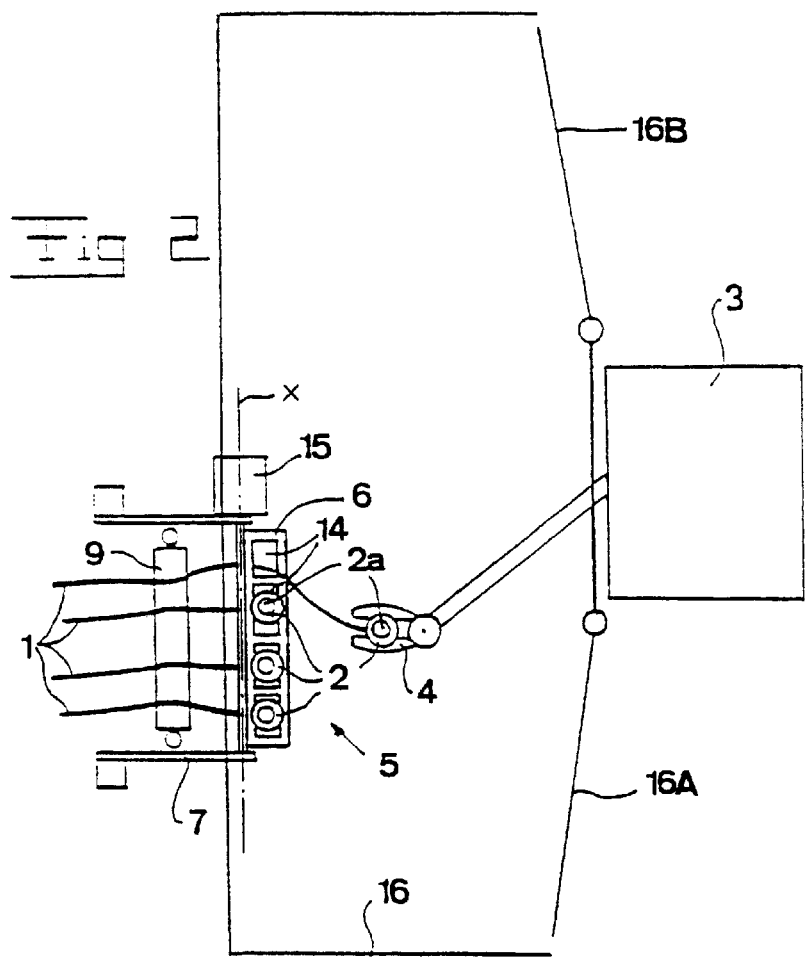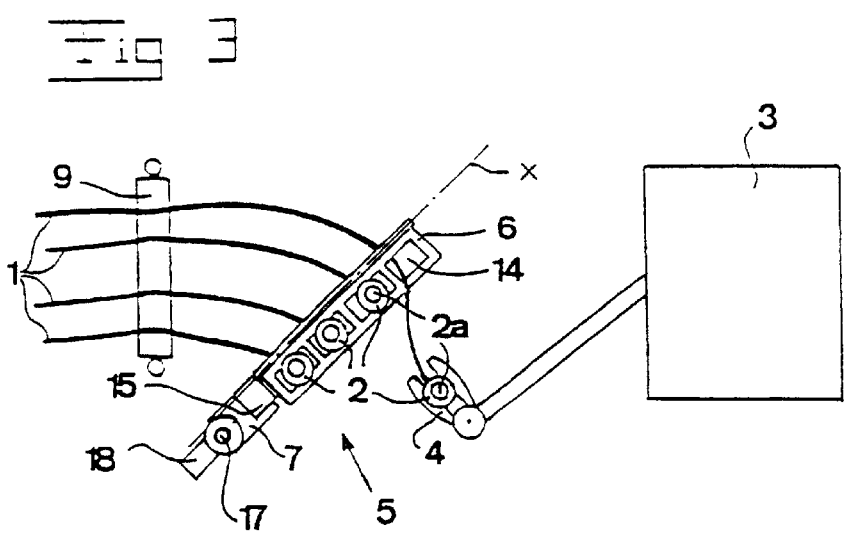

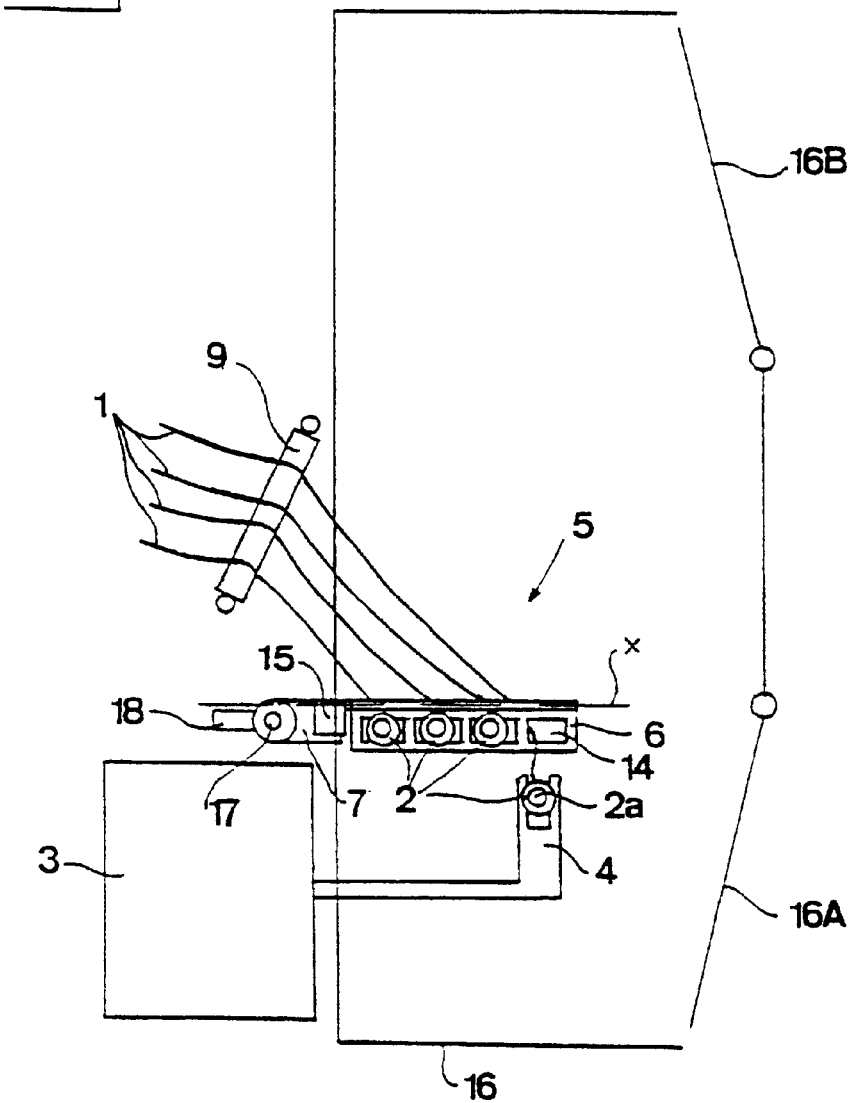

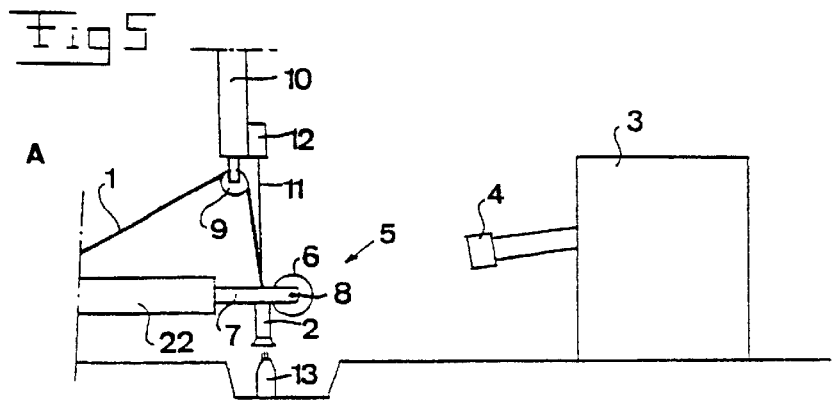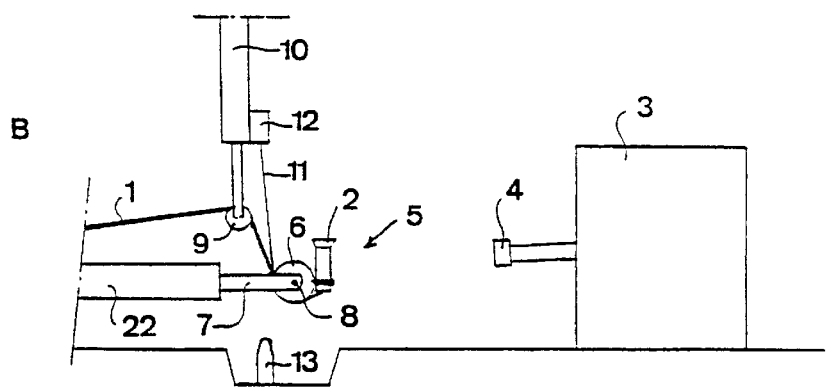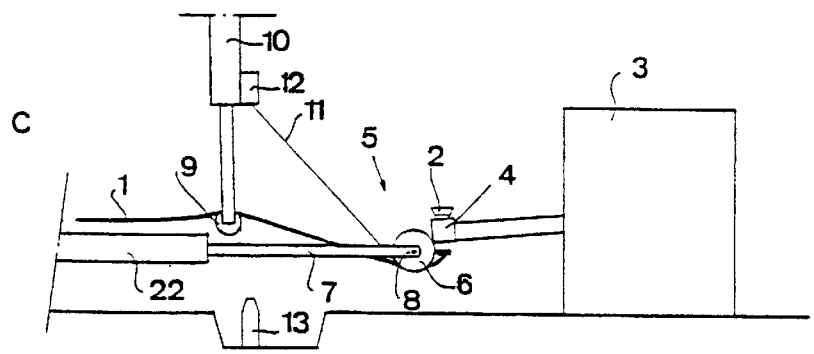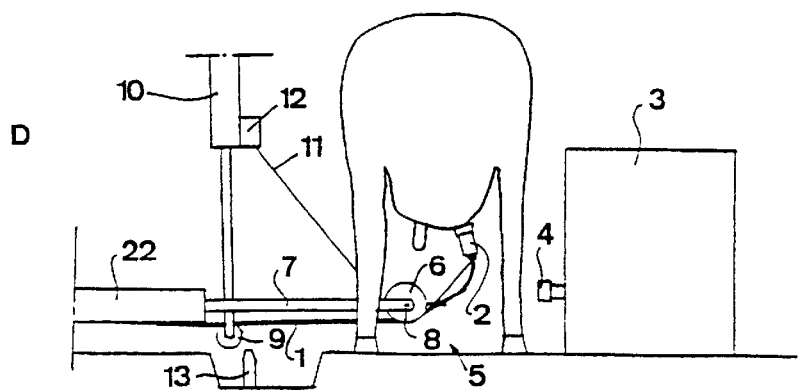
Fig 5

TEATCUP MAGAZINE, A MILKING ARRANGEMENT, AND A METHOD OF HANDLING A TEATCUP

BACKGROUND OF THE INVENTION

1. Field of the Invention

The present invention concerns a teatcup magazine for a milking apparatus, comprising at least one first member provided to receive at least one teatcup and a second member provided to support said first member, said teatcup having an opening through which a teat of an animal is introduced during the attachment of said teatcup to the teat. Furthermore, the present invention concerns a milking arrangement comprising a milking apparatus, having at least one teatcup to be attached to a teat or an animal to be milked, and a teatcup magazine. Moreover, the present invention concerns a method of handling at least one teatcup of a milking apparatus, said teatcup having an opening through which a teat of an animal to be milked is introduced.

2. Description of the Prior Art

A milking stall is known in which the teatcups are received by a cleaning device between each milking procedure. Thereby the opening of each teatcup is turned downwards to provide an appropriate cleaning position and to prevent dirt from reaching the interior of the teatcup between the milking procedures. However, this means that the teatcups have to be turned 180° prior to the attachment to the teats. In the case of manual or semi-automatic milking, when the teatcups are attached by hand by an operator, this turning step is time-consuming and consequently influences the efficiency of the milking negatively, especially when the operator has to take care of a great number of animals.

WO 93/00001 describes a milking arrangement including a teatcup magazine, for storing four teatcups of a milking machine, and an automatic handling device provided to grip successively a teatcup from the teatcup magazine and attach it to the teat of an animal to be milked. The teatcups are held in the teatcup magazine with the opening turned downwards. They are gripped in this position by means of a gripping member of the automatic handling device. The gripping member is rotatably connected to a movable arm of the automatic handling device. A teatcup after being gripped is rotated so that the opening is turned upwards. Thereafter, the teatcup may be attached to a teat of the animal. Such an arrangement has the disadvantage that the movement to be performed by the automatic handling device is relatively complex, and hence requires a great number of movable parts and a sophisticated control system to be realized. Such rotatable gripping member becomes heavy, making it more difficult to obtain a precise positioning of the teaccup during the attachment to the teat.

EP-A-213 660 is another prior art document disclosing an arrangement for automatic milking of cows. An automatic handling device is provided with a robot arm having a gripping member arranged to grip a teatcup from a washing position where the opening of the teatcup is turned downwards. After being gripped the teatcup is rotated so that the opening is turned upwards and thereafter the teatcup is attached to the teat of a cow. Moreover, EP-A-213 660 discloses a rack supported by a robot arm and carrying four teatcups to be attached simultaneously to the teats of the cow. The opening of the teatcups is turned upwards in the embodiment disclosed, and EP-A-213 660 does not describe that these teatcups are ever turned upside down by means of a robot arm or any other manipulating means.

WO90/07268 discloses a milking arrangement comprising an automatic handling device and a teatcup magazine. In order to facilitate the gripping of a teatcup from the teatcup magazine by a robot arm of the automatic handling device, the teatcup magazine is movable from a position outside the milking stall to a position in the milking stall beneath the animal to be milked.

EP-A-91892 discloses a milking arrangement comprising a robot and a milking machine having milking means to be attached to the teats of a cow by means of the robot. When not attached to the teats, the milking means are held by a unit being movable between the position outside the milking stall and a position within the milking stall. However, it is not clear from this document whether the unit is capable of moving the milking means in an active manner from a position outside the milking stall to a position within the milking stall in order to facilitate gripping of the milking means by the robot.

SUMMARY OF THE INVENTION

The object of the present invention is to provide an easier way of attaching the teatcups to the teats of an animal.

This object is obtained by means of the teatcup magazine initially defined and characterized in that the guiding member is movably connected to the support means between a first position, in which said teatcup received by the guiding member has its opening turned substantially downwards, and a second position in which said teatcup received by the guiding member has its opening turned in a direction substantially deviating from said downward direction. By moving the teatcup to such a position, the teatcup may easily be gripped by hand or automatically by means of an automatic handling device. Consequently, by the teatcup magazine according to the invention manual milking may be performed in a more efficient manner and automatic milking may be performed by means of a less complicated automatic handling device in co-operation with the teatcup magazine. In particular, the teatcup, in said second position, may have its opening turned substantially upwards. In such a downwardly directed position the teatcup may easily be cleaned by means of different sorts of cleaning devices known per se. Moreover, in such a position cleaning liquid may easily be discharged from the interior of the teatcup.

According to an embodiment of the present invention, said first member is movably connected to said second member by a joint device permitting said first member to pivot between said first and second positions.

According to a further embodiment of the present invention, first drive means is provided to pivot said first member relative to said second member between said first and second positions. Such drive means may be realized by different means, e.g. by an electric motor, teatcup detachment means and/or a lever having a weight.

According to a further embodiment of the present invention, said first member is movable in a substantially horizontal plane. By making said first member movable, the teatcups to be gripped may be positioned more closely to a gripping means provided in a milking stall. Thereby, second drive means may be provided to move said second member and said first member in said substantially horizontal plane. Such movability may be realized in that said first member is movable along a longitudinal direction comprised by said substantially horizontal plane, or in that said first member is rotatable about an axis forming a normal direction to said substantially horizontal plane. It should be noted that such horizontal movement may include a displacement along the longitudinal direction of the animal to be milked and/or perpendicular to said longitudinal direction.

According to a further embodiment of the present invention, said first member comprises at least one passage provided to receive said teatcup. Moreover, said passage may be provided to guide a conduit means of said teatcup during the attachment of the teatcup to a teat and during the detachment of the teatcup from a teat.

According to a further embodiment of the present invention, the teatcup magazine comprises a plurality of first members each being separately movable. Said first member may also be provided to receive a plurality of teatcups.

According to a further embodiment of the present invention, said teatcup has its opening turned substantially upwards in said second position of the first member. In a further embodiment said teatcup may have its opening turned substantially horizontally in said second position of the first member.

Moreover, the object is obtained by a milking arrangement comprising a milking apparatus, having at least one teatcup to be attached to a teat of an animal to be milked, and a teatcup magazine as defined above.

According to a further embodiment of the present invention, a roller means is provided to support the conduit means during the attachment of the teatcup to a teat.

According to a further embodiment of the present invention, detachment means is provided to detach the teatcup from a teat and to move the teatcup to engagement with said passage. Preferably, said first drive means may comprise said detachment means adapted to pivot said first member from the second position to the first position.

Furthermore, the object is obtained by the method initially defined and comprising the following successive steps of operation:
 holding said teatcup in a first member of a teatcup magazine,
 maintaining the teatcup in said first member in a position in which the opening is turned substantially downwards,
 automatically moving said first member to a position in which the opening of the teatcup is turned in a direction substantially deviating from said downward direction,
 gripping the teatcup,
 removing the teatcup from said first member and the teatcup magazine, and
 attaching the teatcup to a teat of an animal.

Preferred embodiments of the method according to the invention are defined in the dependent claims 20–27.

BRIEF DESCRIPTION OF THE DRAWINGS

The present invention will now be explained more closely by the description of different embodiments thereof and with reference to the drawings.

FIGS. 1A–1D show a view from behind of a milking arrangement according to a first embodiment of the present invention.

FIG. 2 shows a view from above of the milking arrangement in FIGS. 1A–1D.

FIG. 3 shows a view from above of a milking arrangement according to a second embodiment of the invention.

FIG. 4 shows a view from above OL a milking arrangement according to a third embodiment of the invention.

FIGS. 5A–5D show a view from behind of a milking arrangement according to a fourth embodiment of the invention.

DETAILED DESCRIPTION OF DIFFERENT EMBODIMENTS

Figure 6:
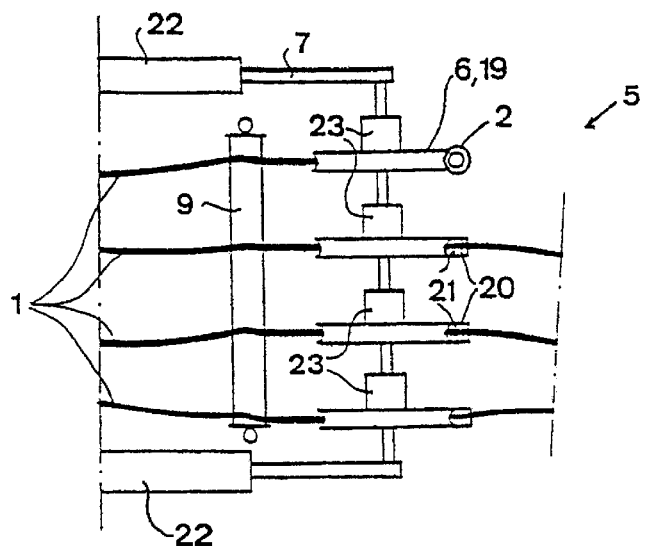
FIG. 6 shows a view from above of a teatcup magazine of the milking arrangement in FIGS. 5A–5D.

FIGS. 1A–1D disclose a milking arrangement according to a first embodiment. The milking arrangement comprises a milking machine merely represented by a milk conduit 1 and a teatcup 2 to be attached to a cow to be milked. The milk conduit 1 is connected to a milk-receiving device (not disclosed) of the milking machine. For the attachment of the teatcups 2 to the cow, the milking arrangement comprises an automatic handling device 3 having a gripping member 4 provided on a robot arm. Furthermore, the milking arrangement comprises a teatcup magazine S arranged to hold the teatcup 2 of the milking machine. The teatcup magazine 5 comprises a first member 6 which in the embodiment disclosed in FIG. 1, comprises a plate-like member 6. The first member 6, or the plate-like member, is supported by a second member 7 in the form of a support. The plate-like member 6 is movably connected to the support 7 by a joint 8 permitting the plate-like member 6 to pivot in relation to the support 7 about a substantially horizontal axis x (see FIG. 2). The milk conduit 1 is guided by means of a roller 9 movably suspended in a pneumatically, hydraulically or electrically driven cylinder device 10. The teatcups 2 may be pulled to the plate-like member 6 by means of a cord 11 activatable by means of a pulling device 12 which in FIGS. 1A–1D is in the form of a pneumatically, hydraulically or electrically driven cylinder device. Beneath the plate-like member 6 there is a cleaning device 13 which in the embodiment disclosed in FIGS. 1A–1D comprises a projecting nozzle for each teatcup 2. Through an orifice in the nozzle 13 cleaning liquid may be supplied to the interior of a teatcup 2.

As may be seen from FIG. 2, the plate-like member 6 comprises four passages 14, one for each teatcup 2 and milk conduit 1. Each passage 14 has two purposes, firstly to engage the teatcup 2, as disclosed in FIGS. 1A and 1C, and secondly to guide and to support the milk conduit 1, as disclosed in FIGS. 1B and 1D. Moreover, FIG. 2 discloses an opening 2a of each teatcup 2 into which the teat of the animal to be milked is introduced during the attachment. Furthermore, the plate-like member 6 is pivotable by means of a drive means 15, for example in the form of an electric, pneumatic or hydraulic motor attached to the support 7 and connected to the plate-like member 6. As is indicated in FIG. 2, the gripping member 4 is rotatably connected to the arm. FIG. 2 also discloses a grid device 16 enclosing a space in which the animal is to be present during the milking process. The grid device 16 comprises an entrance gate 16A and an exit gate 16B.

FIG. 1A discloses the plate-like member 6 in a first position in which the teatcup 2 has its opening 2a turned substantially downwards. Thus FIG. 1A discloses an inactive position of the teatcup 2, which is suitable when no milking takes place since in this position no dirt may penetrate the interior of the teatcup 2 and any liquid collected therein may flow out of the interior of the teatcup 2. In FIG. 1B the teatcup 2 has been lowered onto the cleaning nozzle 13 by means of the cylinder devices 10 and 12. In this teatcup position, cleaning liquid may be supplied through the orifice of the cleaning nozzle 13 for cleaning of the interior of the teatcup 2. When simultaneously a vacuum is applied to the milk conduit 1, the cleaning liquid supplied will flow through the conduit 1 and consequently clean the conduit 1. After the cleaning operation, the teatcup 2 is pulled upwardly to the position disclosed in FIG. 1A. When the teaccup 2 once again is in the position disclosed in FIG. 1A, the plate-like member 6 is pivoted about the axis x to the position disclosed in FIG. 1C. Thereby, the roller 9 is lowered by means of the cylinder device 10 in order to prevent stretching of the milk conduit 1. Moreover, the cylinder device 12 is disconnected in order to enable the extension of the cord 11. In the position disclosed in FIG. 1C, the teatcup 2 is gripped by the gripping member 4 of the automatic handling device 3, disengaged and removed from the passage 14 and the plate-like member 6, and then attached to a teat of a cow being present in the space of the milking arrangement, see FIG. 1D.

FIG. 3 discloses a second embodiment of the teatcup magazine 5 in which the support 7 supports the pivotable plate-like member 6 and the drive means 15 and is rotatable about a vertical shaft 17 in a substantially horizontal plane. This rotating movement is performed by means of a drive means 18 comprising an electric, hydraulic or pneumatic motor. By means of such a rotation, the teatcup magazine 5 is moved into such a position that the gripping of the teatcups is facilitated and that the distance between each passage 14 and a respective teat is reduced. Because of that the milk conduit 1 will be extended along a smoothly curved path when the associated teatcup 2 is attached to the teat.

FIG. 4 discloses a third embodiment of the milking arrangement according to the present invention, which differs from the first and second embodiments in that the automatic handling device 3 is provided at the same side of the milking space as the teatcup magazine 5. Moreover, the teatcup magazine 5 is rotated inwardly into the milking space, substantially 90° from its rest position (cf. FIG. 2). The automatic handling device 3 has been simplified in such a way that the gripping member 4 is fixedly attached to the arm or forms an integrated part thereof.

FIGS. 5A–5D disclose a fourth embodiment of the present invention. Thereby, the first member 6 comprises a set of disks 19, one for each teatcup 2. Each disk 19 has a concave peripheral surface (see FIG. 6) for guiding the milk conduit 1. Furthermore, each disk 19 is provided with a looping member 20 connecting the edges of the peripheral surface and forming a passage 21 between the concave surface and the looping member 20. Also the passage 21 has the function of engaging the teatcup 2 and guiding the milk conduit 1. The pulling device 12 disclosed in FIGS. 5A–5D comprises a winding motor such as a hydraulic, pneumatic or electric motor, preferably a pneumatic motor as disclosed in WO 93/00002. Furthermore, the disks 19 are displaceable in a longitudinal direction from a position above the cleaning device 13 to a position beneath the teats of the cow to be milked, see FIGS. 5C and 5D. The displacement is performed by means of two pneumatically, hydraulically or electrically driven cylinder devices 22, see also FIG. 6. The cleaning device 13 disclosed in FIGS. 5A–5D comprises a nozzle arranged to jetting a flow of cleaning liquid into the interior of the teatcup 2 from beneath.

In the First position, disclosed in FIG. 5A, a teatcup 2 is engaged by the passage 21 and has its opening turned downwards opposite to the cleaning device 13. From this first position, the disk 19 is pivoted about the axis x to the second position disclosed in FIG. 5B in which the teatcup 2 has its opening turned upwards. As disclosed in FIG. 5C the teatcup 2 and the disk 19 is moved in a substantially horizontal plane away from the roller 9 in the direction towards the automatic handling device 3. In this position the teatcup 2 is easily gripped by the gripping member 4 and attached to the teat of the cow.

As disclosed in FIG. 6 each disk 19 is provided with a drive means 23 arranged to individually pivot the disk 19 between the first and second positions. Of course, it is also possible to provide a common drive means for pivoting all the disks 19 simultaneously.

Figure 7:
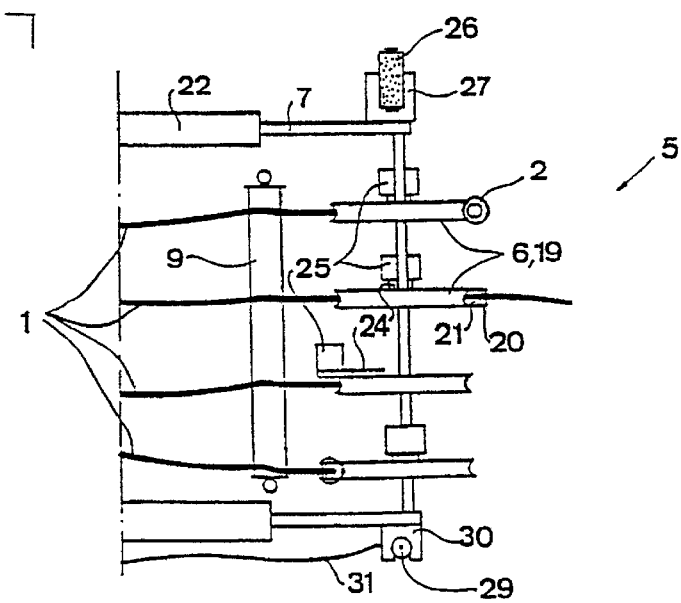
FIG. 7 shows a view from above of a teatcup magazine according to a fifth embodiment of the invention.

FIG. 7 discloses a fifth embodiment in which the drive means for pivoting the disks 19 comprises a lever 24 having a weight 25. Thereby the weight 25 is provided in such a manner that it will pivot the disk 19 such that the looping member 20 normally is in the second position. The disk 19 is rotated in the opposite direction, i.e. the looping member 20 is moved from the second position to the first position, by means of the pulling device 12. The third disk 19 disclosed in FIG. 7 is in an intermediate position between the first and second positions. It may in some cases be appropriate to move the passage 21 to this intermediate position after attachment of the teatcup 2 as a guiding position during milking, in order to obtain a smooth path for the milk conduit. It may also be sufficient to move the teatcup 2 from the first position to such an intermediate position to facilitate the gripping of the teatcup 2 by the gripping member 4 of the automatic handling device 3.

FIG. 7 also discloses a cleaning member 26 loosely attached to a receiving member 27 provided on the support 7. The cleaning member 26 comprises a rotating brush and is adapted to be gripped by the gripping member 4 of the automatic handling device 3 and moved over the udder of the animal for cleaning thereof.

Furthermore FIG. 7 discloses a nozzle member 29 loosely attached to a receiving member 30 of the support 7. The nozzle member 29 is connected to a source of cleaning or disinfecting liquid, such as iodine, via a conduit 31, and is adapted to be gripped by the gripping member 4 of the automatic handling device 3 and directed to the udder of the animal.

Figure 8:
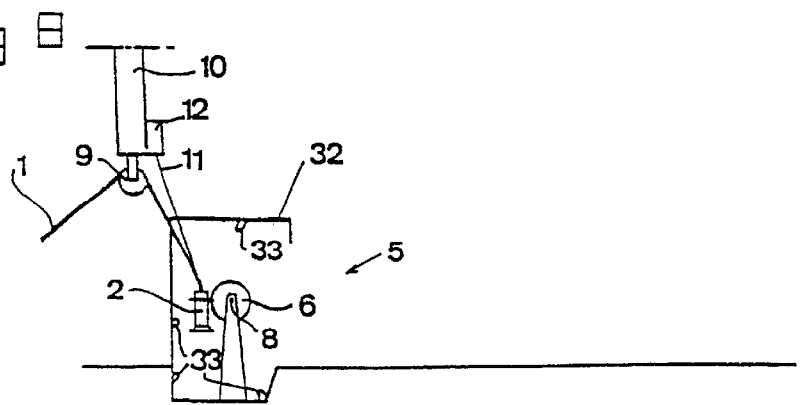
FIG. 8 shows a view from behind of a part of a milking arrangement according to a sixth embodiment of the invention.

FIG. 8 discloses a sixth embodiment having a cover device 32 protecting the teatcup magazine 5 and the teatcups 2 at least when the teatcups 2 are in the first position. The cover device 32 has apertures for the passage of the milk conduits 1 and the cords 11, and is provided with nozzles 33 adapted to supply a cleaning liquid for the cleaning of the exterior of the teatcups 2. The cords 11 are activatable by means of a pulling device 12 in the form of a winding motor as disclosed in FIGS. 5A–5D. In FIG. 8, the teatcup magazine 5 is not displaceable in a horizontal plane. However, it should be noted that such a displacement also in this case is possible.

Figure 9:
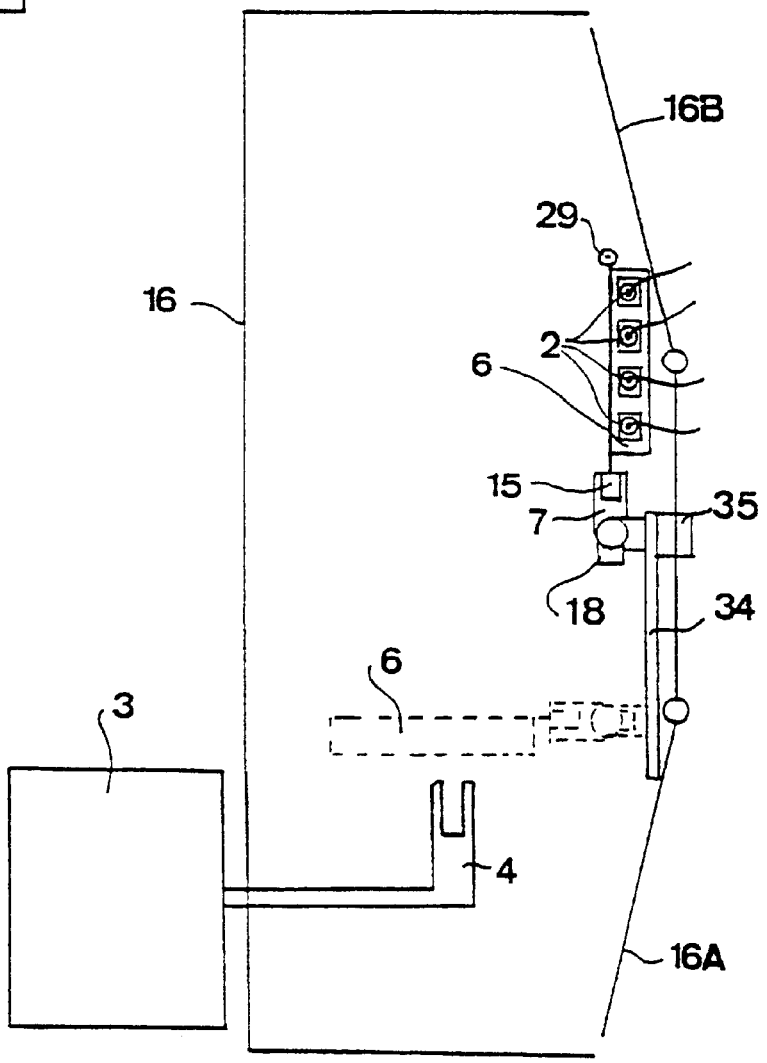
FIG. 9 shows a view from above of a milking arrangement according to a seventh embodiment of the invention.

FIG. 9 discloses a seventh embodiment similar to the second embodiment disclosed in FIG. 3. A plate-like member 6 and a support 7 are rotatable about a vertical axis. Moreover, the support 7 is mounted on a rail member 34 enabling the movement of the support 7 and the plate-like member 6 along a longitudinal direction of the space in which the animal is to be present during the milking procedure. Such longitudinal movement may be realized by a drive means schematically disclosed at 35. Also in this embodiment the plate-like member carries a nozzle member 29 which in this case may be fixedly attached to the plate-like member 6. In this case the nozzle member 29 may be directed towards a desired teat by moving the plate-like member 6.

Figure 10:
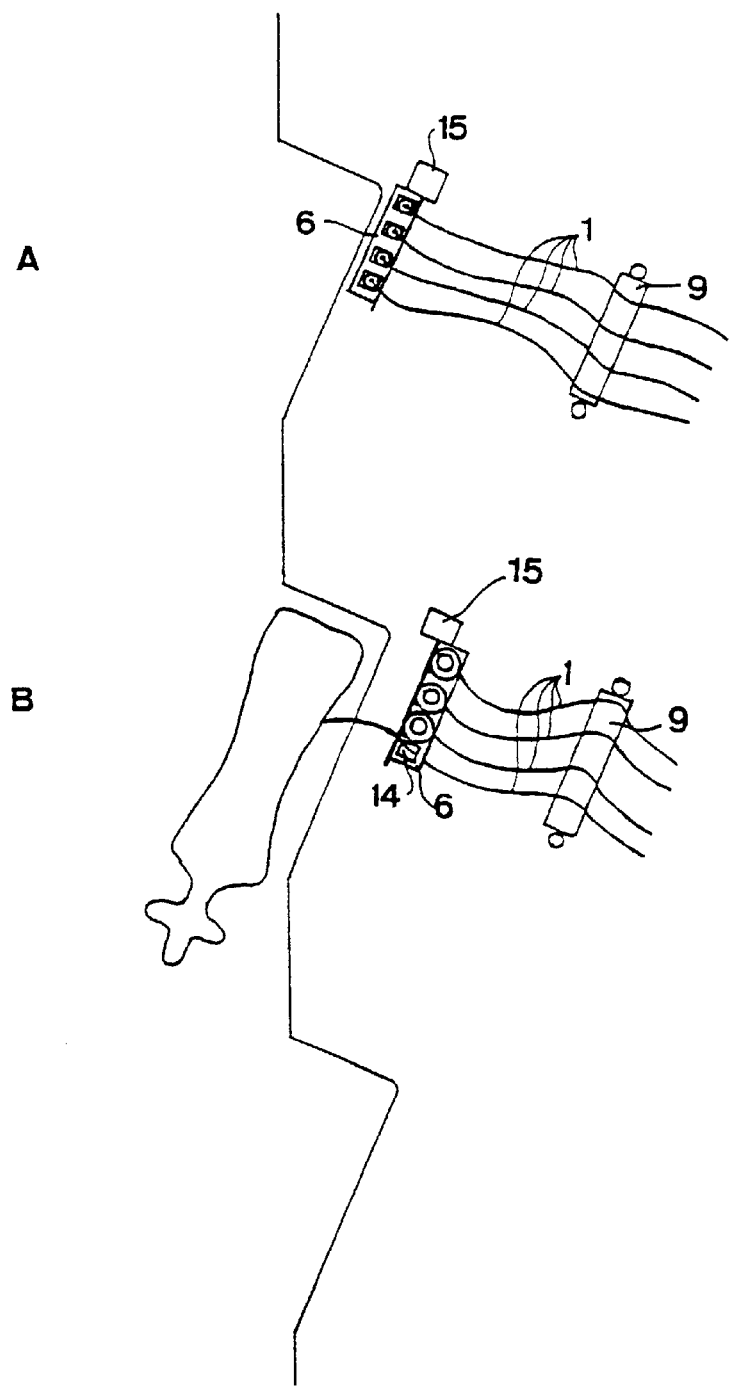
FIGS. 10A–10B show a view from above of a milking arrangement according to an eighth embodiment of the invention.

FIGS. 10A and 10B disclose an eighth embodiment comprising a milking arrangement for manual or semi-automatic milking, i.e. the teatcups 2 are attached manually to the teats of the cow to be milked. By semi-automatic milking is meant that the teatcups are attached manually, although the detachment of the teatcups is performed automatically. In FIG. 10A, the first member 6 is pivoted to the first position in which the teatcups 2 are turned substantially downwards and in FIG. 10B, the first member 6 is pivoted to the second position in which the teatcups 2 are turned substantially upwards and thus may easily be gripped by an operator and thereafter attached to the cow to be milked.

Figure 11:
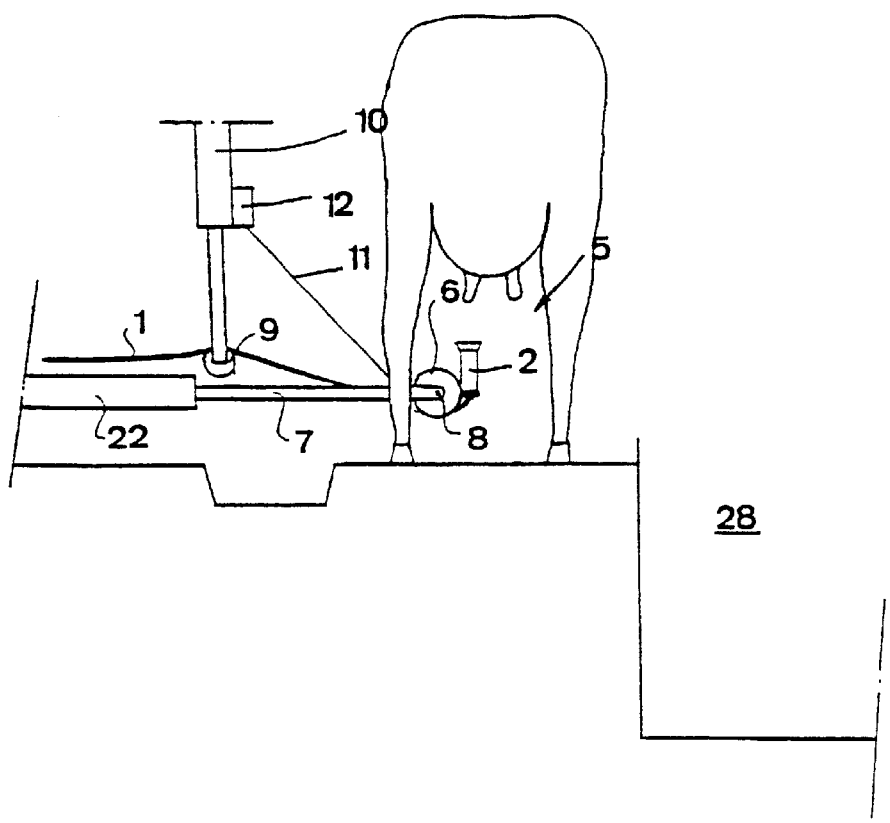
FIG. 11 shows a view from behind of a milking arrangement according to a ninth embodiment of the invention.

FIG. 11 discloses a milking arrangement similar to the fourth embodiment disclosed in FIG. 5, in which the automatic handling device has been replaced by a space 28 for an operator to perform manual or semi-automatic milking. The teatcups 2 brought into the position disclosed in FIG. 10 may easily be gripped by the operator. It should be noted that the milking arrangement disclosed in FIG. 4 also may be arranged for manual or semi-automatic milking.

The present invention is not restricted to the embodiments disclosed but may be varied and modified within the scope of the appended claims.

It is possible to dispense with the pulling device 12 as disclosed and to provide a pulling force by any suitable means via the milk conduit 1 for detachment of the associated teatcup 2, i.e. by applying a pulling force to the milk conduit itself.

It is also possible to replace or combine the cleaning nozzles 13 with a so called back-flush cleaning, i.e. a cleaning liquid is supplied through the milk conduit in a direction opposite to the milk flow. Also in this case, it is of course advantageous to provide the teatcups 2 in the first position during cleaning to assure that all cleaning liquid is discharged from the milk conduit 1 and the teatcup 2.

It is also possible to apply the inventive teatcup magazine 5 to teatcups connected via short milk tubes to a common claw.

Furthermore, it should be noted that although some features have merely been disclosed in connection with one particular embodiment, they are applicable to the other embodiments disclosed.

What is claimed is:

1. A teatcup magazine for a milking apparatus, comprising;
   at least one first member provided to receive at least one teatcup having an opening through which a teat of an animal is introduced during the attachment of the teatcup to the teat; and
   a second member provided to support said first member, wherein said first member is movably connected to said second member between a first position, in which the teatcup received by said first member has its opening turned substantially downwards, and a second position in which the teatcup received by said first member has its opening turned in a direction substantially deviating from said downward direction.

2. A teatcup magazine according to claim 1, wherein said first member is movably connected to said second member by a joint device permitting said first member to pivot between said first and second positions.

3. A teatcup magazine according to claim 1, including first drive means provided to pivot said first member relative to said second member between said first and second positions.

4. A teatcup magazine according to claim 1, wherein said first member is movable in a substantially horizontal plane.

5. A teatcup magazine according to claim 4, including second drive means provided to move said second member and said first member in said substantially horizontal plane.

6. A teatcup magazine according to claim 4, wherein said first member is movable along a longitudinal direction comprised by said substantially horizontal plane.

7. A teatcup magazine according to claim 4, wherein said first member is rotatable about an axis forming a normal direction to said substantially horizontal plane.

8. A teatcup magazine according to claim 1, wherein said first member comprises at least one passage provided to receive said teatcup.

9. A teatcup magazine according to claim 8, wherein said passage is provided to guide a conduit means of the teatcup during the attachment of the teatcup to a teat and during the detachment of the teatcup from a teat.

10. A teatcup magazine according to claim 1, including a plurality of first members each being separately movable.

11. A teatcup magazine according to claim 1, wherein said first member is provided to receive a plurality of teatcups.

12. A teatcup magazine according to claim 1, wherein said teatcup has its opening turned substantially upwards in said second position of the first member.

13. A teatcup magazine according to claim 1, wherein the teatcup has its opening turned substantially horizontally in said second position of the first member.

14. A milking arrangement comprising a milking apparatus having at least one teatcup to be attached to a teat of an animal to be milked, and a teatcup magazine according to claim 1.

15. A milking arrangement according to claim 14, including conduit means attached to said teatcup and roller means. and wherein said first member includes at least one passage provided to receive said teatcup and guide said conduit means during the attachment of the teatcup to a teat and during the detachment of the teatcup from a teat and the roller means is provided to support the conduit means during the attachment of the teatcup to a teat.

16. A milking arrangement according to claim 15, including detachment means provided to detach the teatcup from a teat and to move the teatcup to engagement with said passage.

17. A milking arrangement according to claim 16, wherein said first drive means comprises said detachment means adapted to pivot said first member from a second position to the first position.

18. A milking arrangement according to claim 14, including an automatic handling device having a gripping member provided to grip a teatcup from the teatcup magazine when said first member is in the second position, and attach the teatcup to a teat of the animal.

19. A method of handling at least one teatcup of a milking apparatus, said teatcup having an opening through which a teat of an animal to be milked is introduced, comprising the following successive steps of operation:
   holding said teatcup in a first member of a teatcup magazine,
   maintaining the teatcup in said first member in a position in which the opening is turned substantially downwards, automatically moving said first member to a position in which the opening of the teatcup is turned in a direction substantially deviating from said downward direction, gripping the teatcup, removing the teatcup from said first member and the teatcup magazine, and attaching the teatcup to a teat of the animal.

20. A method according to claim 19, wherein said gripping step and removing step are performed automatically by means of an automatic handling device provided separately with respect to the teatcup magazine.

21. A method according to claim 20, wherein said attachment step is performed automatically by means of said automatic handling device.

22. A method according to claim 20, wherein said gripping step comprises gripping the teatcup by means of said automatic handling device when turned in a direction substantially deviating from said downward direction.

23. A method according to claim 19, wherein the teatcup is transferred automatically from a teat to said first member prior to said holding step.

24. A method according to claim 19, wherein said maintaining step comprises cleaning of the teatcup.

25. A method according to claim 19, wherein said moving step comprises rotating said first member.

26. A method according to claim 19, wherein said moving step comprises automatically moving said first member to a position in which the teatcup has its opening turned substantially upwards.

27. A method according to claim 19, wherein said moving step comprises automatically moving said first member to a position in which the teatcup has its opening turned substantially horizontally.

* * * * *